Figure 3:
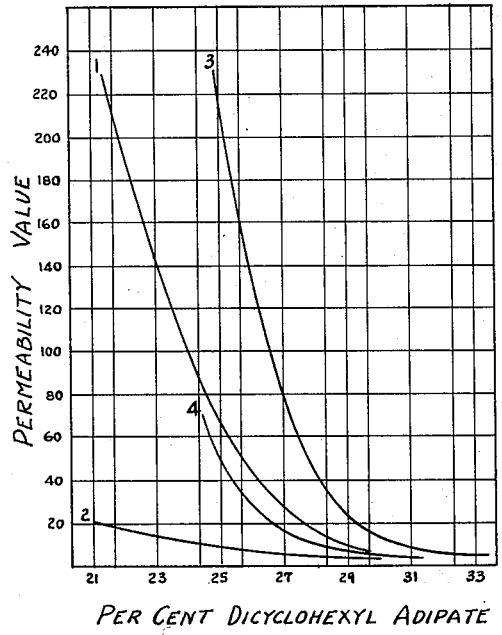

July 6, 1937.  F. M. MEIGS  2,085,816
MOISTUREPROOF FILM
Filed May 3, 1934  2 Sheets-Sheet 1

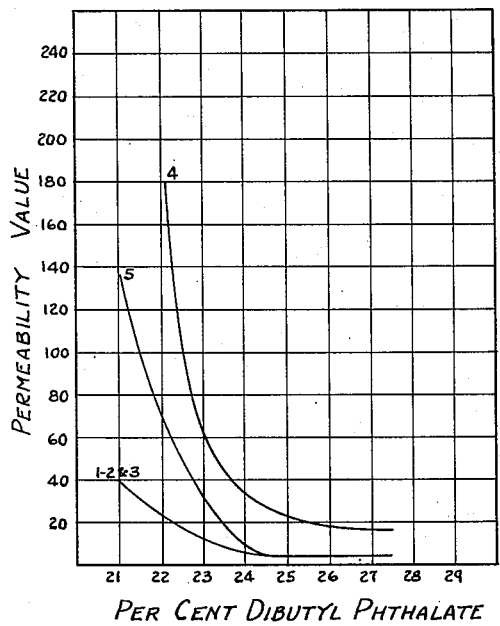

Fig. 1

DIBUTYL PHTHALATE
  AS PLASTICIZER

4% ASIATIC PARAFFIN
PYROXYLIN/RESIN RATIO 4/1

1. DAMAR.
2. DIETHYLENE GLYCOL
    DIHYDROROSINATE.
3. HYDROGENATED ROSIN.
4. ROSIN.
5. DIETHYLENE GLYCOL
    ROSINATE.

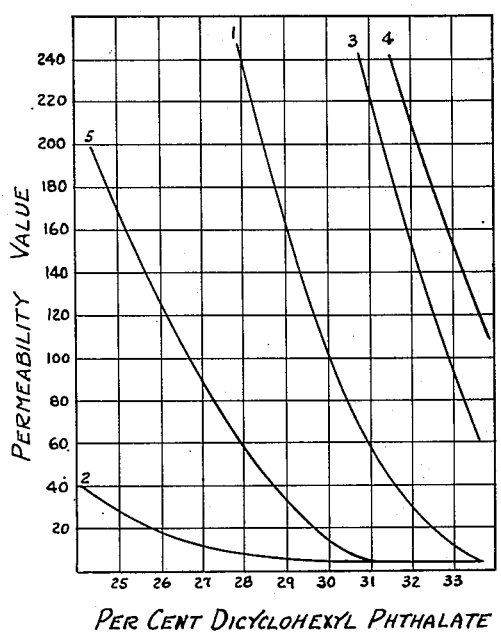

Fig. 2

DICYCLOHEXYL PHTHALATE
  AS PLASTICIZER

4% ASIATIC PARAFFIN
PYROXYLIN/RESIN RATIO 4/1

1. DAMAR.
2. DIETHYLENE GLYCOL
    DIHYDROROSINATE.
3. DIETHYLENE GLYCOL
    ROSINATE.
4. ESTER GUM.
5. METHYL CARBITOL
    HYDROROSINATE.

INVENTOR.
Frederick M. Meigs
BY Charles F. Daley
    ATTORNEY.

4% Asiatic Paraffin
Pyroxylin/Resin Ratio 4/1

1. 12.5% $N_2$ Px - Damar.
2. 12.5% $N_2$ Px - Diethylene Glycol Dihydrorosinate.
3. 11.5% $N_2$ Px - Damar.
4. 11.5% $N_2$ Px - Diethylene Glycol Dihydrorosinate.

4% Asiatic Paraffin
12.5% $N_2$ Pyroxylin -
15" Viscosity

Pyroxylin Dicyclohexyl
Adipate Ratio 2.16/1

1. Damar.
2. Diethylene Glycol Dihydrorosinate.

INVENTOR.
Frederick M. Meigs
BY Charles F. Daley
ATTORNEY.

Patented July 6, 1937

2,085,816

UNITED STATES PATENT OFFICE 2,085,816

MOISTUREPROOF FILM

Frederick M. Meigs, Wilmington, Del., assignor, by mesne assignments, to E. I. du Pont de Nemours & Company, Wilmington, Del., a corporation of Delaware Application May 3, 1934, Serial No. 723,785

6 Claims. (Cl. 91—68)

This invention relates to compositions of matter, and in particular it relates to the use of such compositions in moistureproofing of regenerated cellulose film and films of similar character.

Various methods for coating regenerated cellulose film to produce moistureproof wrapping tissues have been disclosed in Charch and Prindle U. S. Patent No. 1,737,187, issued November 26, 1929. In general, this moistureproofness is obtained by applying to the cellulosic base a composition comprising a cellulosic material such as cellulose nitrate, a solvent therefor, a wax or wax-like material, a plasticizer and a blending agent. In many instances, the blending agent is a resin and in such case, in addition to its blending characteristic, it may also have certain film forming characteristics. Similarly, in the case of certain resins, more or less plasticizing action on the cellulose derivative comprising the base of the moistureproofing composition, is exercised by the resin.

In the preparation of moistureproofing coating compositions of the type just described, it has been customary to employ as the resinous constituent natural or synthetic resins such as damar, copal, kauri, poly-basic acid-polyhydric alcohol resinous condensation products with or without the addition of modifying agents such as monohydric alcohols, mono-basic acids, drying oils, non-drying oils, et cetera. Of the commonly useful resins, damar has been recognized as the most desirable of the known resins for use in moistureproofing compositions. Attempts to use rosin or ester gum have met with only partial success because of undesirable properties possessed by them, namely, brittleness, relatively poor weathering properties, and a tendency to change and to degrade as to color, transparency, flexibility and even solubility.

One object of this invention relates to new compositions of matter. Another object of the present invention is to prepare highly satisfactory and low cost compositions for use in the moistureproofing of wrapping tissues. It is a further object of the invention to prepare compositions of this character containing hydrogenated rosin and/or hydrogenated rosin derivatives. Other objects of the invention will appear hereinafter.

For the purposes of this invention, moistureproof materials are defined as those which, in the form of a thin, continuous and unbroken film, will permit the passage of not more than 690 grams of water vapor per 100 square meters per hour, over a period of 24 hours at approximately 39.5 degrees C. ±0.5 degree C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of thin, continuous, unbroken films, applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film, applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. ±0.5° C. (preferably 39.5° C. ±0.25° C.) with a water vapor pressure differential of 50–55 m. m. (preferably 53.4±.07 m. m.) of mercury. For convenience, the number of grams of water vapor passed under these conditions may be referred to as the "permeability value." An uncoated sheet of regenerated cellulose having a thickness of approximately 0.0009" will show a permeability value of the order of 6900.

In the foregoing, it is apparent that under the conditions set forth, a moistureproof regenerated cellulose sheet is capable of resisting the passage of moisture or water vapor therethrough at least ten times as effectively as the uncoated regenerated cellulose sheet.

In accordance with the present invention, it has been found that hydrogenated rosin and its derivatives can be successfully and advantageously employed as substitutes for damar and the like in moistureproofing compositions (for convenience, the term "hydrorosinates" will be used to define that class of materials which include hydrogenated rosin and hydrogenated rosin derivatives, for example, hydrogenated rosin esters). Because of their improved and desirable characteristics such as light color, transparency, flexibility and compatibility with cellulose derivatives and/or waxes or wax-like materials, the hydrorosinates are particularly well suited to the preparation of these compositions containing waxes or wax-like substances. Furthermore, it has been found that the use of hydrorosinates permits a reduction in the amount of plasticizer required to produce suitable moistureproofing coating compositions which will, when deposited in the form of thin films or coatings, result in flexible, transparent and moistureproof layers which are non-tacky, non-smeary, durable and adapted for application to various base materials as will be more specifically set forth hereinafter.

The following examples, which are illustrative in character, disclose methods and means for applying the principles of the invention:

be harder and more resinous than esters of the simpler alcohols.

The preparation of hydrogenated rosin and/or its esters is not a part of this invention, and therefore need not be discussed in detail. Suffice to say that hydrogenated rosin, hydrogenated abietic acid and/or their esters, prepared in any of the ways known to the art will find application in accordance with the principles of this invention.

Hydrogenated rosin and its esters are compatible with cellulose derivatives, particularly cellulose nitrate and cellulose ethers such as ethyl or benzyl cellulose. Hydrogenated rosin and its esters may also be combined in small amounts with cellulose acetate, for certain purposes, to produce

*Table I*

| | | Examples | | | | | | | | | | | | | | | |
|---|---|---|---|---|---|---|---|---|---|---|---|---|---|---|---|---|---|
| | | I | II | III | IV | V | VI | VII | VIII | IX | X | XI | XII | XIII | XIV | XV | XVI |
| Resin | Hydrorosin | | | | | 14.4 | | | | | | | | | | | |
| | Hydro ester gum | 18.0 | 8.0 | | | | | | | | | | | | | 2.5 | |
| | Diethylene glycol hydrorosinate | | | 13.8 | 27.0 | | | | | 28.4 | 14.0 | 24.0 | 14.0 | | 41.0 | | |
| | B-methoxy ethyl hydrorosinate | | | | | | 27.5 | 14.4 | | | | | | | | | 15.0 |
| | B-methoxy-B-ethoxy ethyl hydrorosinate | | | | | | | | | | | | | 13.1 | 41.0 | | |
| Cellulose derivative | Cellulose nitrate | 55.0 | 62.0 | 56.2 | 47.2 | 57.5 | 47.4 | 57.5 | 46.2 | 57.7 | 45.4* | 51.6* | 52.2 | 56.0 | 56.0 | | |
| | Cellulose acetate | | | | | | | | | | | | | | | | |
| | Ethyl cellulose | | | | | | | | | | | | | | | 67.0 | |
| Plasticizer | Dibutyl phthalate | 23.0 | 26.0 | | | 24.1 | 19.3 | 24.3 | 17.7 | 24.3 | | | | | | 60.0 | 21.0 |
| | Dicyclohexyl phthalate | | | 26.2 | 20.2 | | | | | | | | | | | | |
| | Dicyclohexyl adipate | | | | | | | | | | | | | 30.7 | | | |
| | Tricresyl phosphate | | | | | | | | | | | 26.6 | 30.4 | | | | |
| | Bu-o-benzoyl benzoate | | | | | | | | | | | | | | | 30.0 | |
| Wax | Asiatic paraffin | 4.0 | 4.0 | 3.8 | 5.6 | 4.0 | 5.5 | 3.8 | 7.7 | 4.0 | 4.0 | 4.0 | 4.0 | 3.0 | 3.0 | 0.5 | 4.0 |
| Appropriate solvent mixtures | Ethyl acetate | 58 | 58 | 62 | 62 | 58 | 62 | 62 | 60 | 60 | 52 | 52 | 62 | 66 | 66 | | 16 |
| | Toluene | 38 | 38 | 35 | 35 | 38 | 35 | 35 | 37 | 37 | 35 | 35 | 35 | 31 | 31 | | 60 |
| | Alcohol | 4 | 4 | 3 | 3 | 5 | 3 | 3 | 3 | 3 | 13 | 13 | 3 | 3 | 3 | | 24 |
| | Methyl ethyl ketone | | | | | | | | | | | | | | | | |
| | Cyclohexanone | | | | | | | | | | | | | | | 62.5 | 18.75 |
| | B-methoxy ethyl alcohol | | | | | | | | | | | | | | | 18.75 | |

* Cellulose nitrate containing 11.5 percent combined nitrogen. All other examples are directed to cellulose nitrate containing about 12.5 percent combined nitrogen.

Hydrogenated rosins, hydrogenated rosin esters, and other hydrogenated rosin derivatives are prepared according to known methods by subjecting rosin or its esters to the action of hydrogen gas at elevated temperatures and pressures in the presence of certain catalysts. Hydrogenated rosin so obtained may be converted to the desired esters by reaction with appropriate alcohols, or alternatively the dissolved rosin ester may be hydrogenated, although generally it is preferable to follow the former procedure. Hydrogenated rosin resembles natural rosin in its appearance and general properties although it is usually lighter in color, tougher, more resistant to shock, and not as susceptible to decomposition and degradation. Even when using crude or darkly colored qualities of rosin as a starting material, it is possible to obtain hydrogenated rosin of extremely light color and of improved transparency, thereby enabling the use of cheaper raw materials to secure a product of high quality and increased utility.

The esters of hydrogenated rosin resemble generally the esters of natural rosin, but they too show improved properties just as hydrogenated rosin is superior to natural rosin. The physical consistency of hydrogenated rosin esters varies, of course, with the alcohol used for esterification, and esters of low molecular weight alcohols tend to be more liquid than esters of the higher alcohols, while esters of polyhydric alcohols tend to compositions which show marked improvement over those obtained from natural rosin or its derivatives.

Generally speaking, this invention pertains to the provision of moistureproofing coating compositions comprising hydrorosinates in combination with cellulose derivatives and moistureproofing agents such as waxes or wax-like materials. Such compositions may also include plasticizing agents, drying or non-drying oils, additional resinous materials of either the natural or synthetic varieties, coloring agents either as dyes or pigments, or other modifying agents according to the type of coating composition preferred. The proportions of the ingredients may be varied within wide limits depending on the properties desired in the finished coating. The total film-forming constituents, for convenience referred to as total solids, may be varied according to the build to be attained; the proportion of hydrorosinates may determine the hardness, adhesion and gloss; the plasticizer will assist in obtaining suitable flexibility and other constituents will affect other properties. The coating compositions also include solvents and solvent mixtures which are adapted to the purposes of the coating composition and to the method of applying the coating composition to the desired base and can be adjusted in accordance with the practices of one skilled in the art.

The preferred form of the invention pertains to the moistureproofing of regenerated cellulose films. The coating compositions prepared in accordance with this invention may also, however, be applied to other base materials obtainable by coagulation or precipitation from aqueous cellulosic dispersions such as dispersions of cellulose glycolic acid, glycol cellulose or lowly etherified cellulose ethers, or the film base may be cellulose ester sheeting, e. g., cellulose acetate sheeting, cellulose ether sheeting, e. g., methyl cellulose, ethyl cellulose or benzyl cellulose sheeting, gelatin, casein, and also paper and fabrics.

In the preparation of moistureproofing coating compositions comprising a cellulose derivative and a wax, it is customary to include some material which will improve the compatibility of the cellulose derivative and the wax, and this material is frequently referred to as a blending agent. A plasticizer is also used to improve the flexibility of the film. Where highly moistureproof compositions are desired, it is essential that more plasticizer be employed than is required to flexibilize the resulting coating. With the large amounts of plasticizer used in producing highly moistureproof coating compositions, the surface characteristics of the product are apt to suffer, that is, the surface may tend to be tacky, easily smeared or otherwise unsatisfactory. Additionally, since the plasticizer is usually the most expensive ingredient, the use of substantial amounts adds materially to the cost of the coating composition and consequently of the coated product. It is apparent, therefore, that any provision for decreasing the amount of plasticizer required while still producing coating compositions which are highly moistureproof, will contribute greatly to the advancement of the art. Hydrorosinates are particularly well suited to the preparation of moistureproofing compositions containing waxes or wax-like substances. Furthermore, it has been found in accordance with the present invention, that the use of hydrorosinates permits a reduction in the amount of plasticizer required to produce suitable moistureproofing coating compositions which will, when deposited in the form of thin films or coatings, result in flexible, transparent and moistureproof layers which are nontacky, non-smeary, durable and adapted for application to various base materials.

By way of illustration may be considered specifically those moistureproofing compositions comprising a cellulose derivative, a resin, a wax or wax-like substance, and a plasticizer. A systematic study of these compositions reveals that with any given plasticizer concentration, a system may be obtained wherein, generally speaking, hydrorosinates are equal to or better than gum damar while rosin or rosinates are generally poorer. At this point, it may be said that there are certain rosinates which may be better than damar, but even these are inferior to corresponding hydrorosinates so that in any event the hydrorosinates are to be preferred. Hence, with the same plasticizer, and with the same or comparable plasticizer concentration, the hydrorosinates are always preferred to the rosinates and are at least equal to and usually better than other resins such as damar.

Referring to the figures of the drawings, these figures represent curves drawn to show the relation between moisture permeability and plasticizer concentration in systems employing different resin componets while the ratio of cellulose derivative to resin and the gross amount of moistureproofing agent (wax) remain constant. In Figs. 1 and 2, compositions are shown which employ a nitrocellulose of 15 seconds viscosity and containing 12.5% nitrogen with the ratio of 4:1 (cellulose derivative : resin) and containing 4% of wax (specifically Asiatic paraffin), based on the total solid content of the system. The curves were obtained by coating a film of regenerated cellulose on both sides with a thin layer of the composition through the medium of a suitable solvent mixture, removing the solvent at an elevated temperature (common to all) and measuring the amount of water vapor transmitted in accordance with the above described method for the determination of permeability value.

In Fig. 1 the plasticizer is dibutyl phthalate. Curves 1, 2 and 3 are coincident and represent similar compositions comprising damar, diethylene glycol hydrorosinate and hydrorosin respectively, while curves 4 and 5 represent similar compositions comprising rosin and diethylene glycol rosinate respectively. It will be seen quite easily that at any given plasticizer concentration the hydrorosin or its derivatives are equal to damar and superior to rosin and also markedly superior to the rosinate when the plasticizer concentration is low. For instance, at 23% plasticizer (based on total solids) the permeability of the rosin system is more than five times that of the hydrogenated rosin system while the rosinate system shows nearly three times the permeability of either the hydrogenated rosin or the hydrogenated ester systems. The difference becomes even more marked with further decrease in plasticizer concentration.

The difference is still greater when a plasticizer such as dicyclohexyl phthalate is employed, as illustrated in Fig. 2. It is apparent from these curves that the hydrorosinates are superior to damar and far superior to the rosinates. Thus a system containing 31% dicyclohexyl phthalate may have a permeability value of the order of 4 when hydrorosinates are employed, of the order of 58 with damar, and of the order of 225 or more with rosinates.

The usefulness of the hydrorosinates is not restricted to any one type of nitrocellulose and the general properties remain relatively the same. A nitrocellulose of low nitrogen content will generally require more plasticizer than a high nitrogen nitrocellulose if a comparable permeability result is to be obtained. This is borne out in Fig. 3 wherein curves 1 and 3 represents systems containing nitrocelluloses of 12.5 and 11.5% nitrogen respectively, a wax content of 4% and damar present in 1:4 ratio with respect to the nitrocellulose. Curves 2 and 4 represent corresponding systems using diethylene glycol hydrorosinate. The plasticizer in all cases is dicyclohexyl adipate. Here again it is apparent that the hydrorosinate is superior to the damar.

Figure 4:
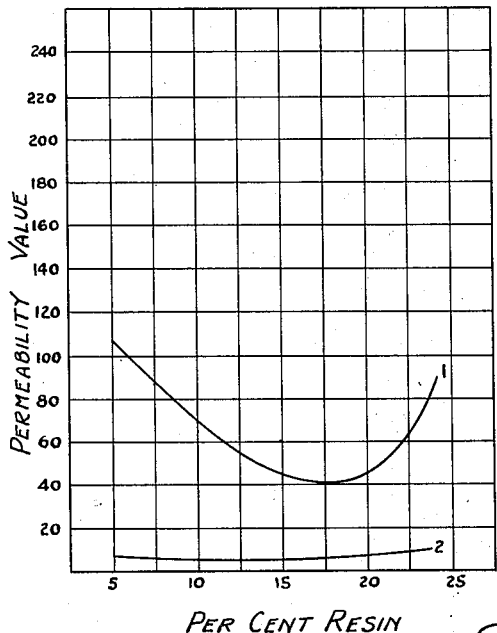

Another important characteristic of hydrorosinate systems is illustrated in Fig. 4. The curves here represent the relation between permeability and resin content with a fixed ratio of cellulose derivative to plasticizer. It is to be observed that with dicyclohexyl adipate as the plasticizer and the ratio of nitrocellulose to plasticizer constant at 2.4:1, the permeability of the systems employing hydrorosinate is always less than that of damar systems and furthermore that the permeability of the hydrorosinate systems is substantially constant over a remarkably long range of resin content.

It will be understood, of course, that all of these curves are merely illustrative of the particular compositions described and that other compositions may show different values although the general form and nature of the curves and their mutual relation will be comparable to those illustrated. In addition, it is to be appreciated that the source of rosin or rosin derivatives to be converted to hydrorosinates may alter the precise permeability values to be obtained, but here again comparison of hydrorosinates derived from a given rosin with that rosin or its rosinates will provide relations of the order set forth.

The unique properties of moistureproofing coating compositions comprising hydrorosinates are highly unobvious and the use of such compositions makes possible the practice of many economies besides resulting in numerous desirable advantages. In compositions employing plasticizers these latter are probably the most expensive of all the constituents and consequently the use of a hydrorosinate permits a reduction in the amount of plasticizer needed. The surface characteristics of coated objects depend, in many instances, on the plasticizer content and are consistently improved by a decrease in the plasticizer concentration. Thus, for example, sheets or films of regenerated cellulose coated with moistureproofing compositions must also possess good surface so that adjacent sheets will slip properly for handling and will not smear or adhere to one another when stacked. The reduction of plasticizer concentration, without impairment and usually with improvement of moisture impermeability, through the use of hydrorosinates, offers admirable opportunity for also improving surface slip and the like. Rosin has long been prized in the varnish industry because of its high gloss, good build, easy solubility and low cost. The hydrorosinates retain the gloss, build and solubility and additionally possess improved toughness, flexibility and color while the cost of hydrogenation still permits its availability at a low price.

For the preparation of these new moistureproofing, coating compositions, it is possible to use hydrorosin itself or any of its esterification products. The esters of polyhydric alcohols such as ethylene glycol, glycerol, and trimethylene glycol, are well adapted for use. Esters of alkyl or aralkyl alcohols, such as methyl, ethyl, propyl, butyl, cetyl, stearyl alcohols, benzyl or naphthyl alcohols, may be used for certain purposes although usually these esters are too soft or liquid to constitute substitutes for such resins as damar. It has been found that esters of ether alcohols are particularly desirable. Thus, the esters of $\beta$-methoxy-ethyl alcohol (commonly available under the trade name Methyl "Cellosolve") $\beta$-ethoxy-ethyl alcohol (available under the trade name "Cellosolve"), $\beta$-methoxy-$\beta'$-hydroxy-diethyl ether, and $\beta$-,$\beta'$-dihydroxydiethyl ether are very useful with the last named of outstanding utility. With regard to esters of polyhydric alcohols, the completely esterified product is preferable, as, for example, that which would be obtained by combining 2 molecules of hydrogenated rosin with 1 molecule of ethylene glycol.

For the cellulose derivative it is possible to use cellulose ethers such as glycol-, ethyl-, or benzyl-cellulose, cellulose esters such as cellulose nitrate which is particularly useful, cellulose acetate which is of limited compatibility, and such mixed esters or ether esters as cellulose acetate-nitrate, cellulose acetate-propionate or ethyl cellulose-nitrate. These cellulose derivatives may be of various degrees of conversion, as, for example, cellulose nitrates of various nitrogen content. As plasticizers, it is possible to use any of the well-known plasticizers, including such substances as tricresyl phosphate, dibutyl phthalate, di-cyclohexyl phthalate, di-methylcyclohexyl phthalate, di-(di-methyl-cyclohexyl) phthalate, di-cyclohexyl adipate, methyl-(di-methyl-cyclohexyl) adipate and butyl benzoylbenzoate. In some instances it may be possible to use only very small amounts of plasticizer or even to eliminate the plasticizer entirely.

As moistureproofing agents, it is possible to use waxes or wax-like materials such as paraffin, petrolatum, ceresine, Japan wax, palm wax, beeswax, certain chlorinated hydrocarbons, Chinese insect wax or other synthetic waxes or wax-like materials. If some of these substances are too soft for the purposes desired, they may be mixed with harder waxes of the group just listed or with carnauba wax, candelilla wax or other harder synthetic waxes. Indeed sometimes it may be desirable to use only the harder waxes such as carnauba or candelilla, although it is preferable to employ a wax such as paraffin as the moistureproofing agent and to harden this by the addition of carnauba or candelilla wax if necessary.

In the examples which accompany this specification, Asiatic paraffin has been employed as typical of a highly satisfactory moistureproofing agent, but it is to be understood that other moistureproofing agents may be successfully employed.

In many instances, it may be desirable to add other resinous materials to moistureproofing coating compositions comprising the hydrorosinates and for this purpose any of the natural or synthetic resins commonly available may be used so long as they are compatible and form homogeneous mixtures. Such resins may include the rosinates, damar, copal, kauri, polyhydric alcohol-poly-basic acid resinous condensation products, vinyl derivatives, chlorinated diphenyl resins, soluble phenolformaldehyde resins or the like.

For the usual coating methods, these compositions must be available as solutions and for this purpose any of the usual solvents and solvent mixtures familiar to the skilled worker in the art will serve. Generally speaking, the solvent will contain a cellulose derivative solvent and a wax solvent as well as a solvent for the hydrorosinate and optionally a diluent. It is apparent that the same solvent may serve both for the hydrorosinate and the other constituents and indeed it may be that the cellulose derivative solvent will also be a wax solvent. A solvent mixture comprising 30–60% ethyl acetate, 30–35% toluene and the balance ethyl alcohol will usually be found to operate satisfactorily. Depending on the amount and nature of the cellulose derivative or the wax, the amount and nature of their respective solvents will vary. Satisfactory solvents for specific compositions are illustrated in the accompanying examples.

The moistureproofing coating compositions may be used on various bases including sheets or films of regenerated cellulose whether they be made by the viscose process, the cuprammonium process or by any other manufacturing technique. Sheets or films of cellulose ethers such as ethyl-, benzyl-, or glycol-cellulose, cellulose esters such as cellulose nitrate or cellulose acetate, gelatin, casein, parchment, chemically or mechanically treated or hydrated paper, tissue paper or the like, surfaces of metal, wood, et cetera, may also be coated with these compositions.

In the preparation of transparent, moistureproof wrapping tissues, a suitable wax-containing composition comprising a cellulose derivative and hydrorosin or hydrorosinates may be applied to the desired base in accordance with the methods known to the art. The solvents may be removed and the coated material subjected to an elevated temperature at least equal to the melting point of the wax, whence a clear, transparent, moistureproof film may be obtained. The technique of this procedure is set forth in such patents as the Charch and Prindle patent noted above.

Thus far, only moistureproofing coating compositions comprising plasticizing agents have been specifically discussed. As has been stated above, the use of hydrorosinates permits a reduction of the amount of plasticizer necessary for the preparation of suitable coating compositions. In view of this, it is possible to eliminate special plasticizers and still obtain satisfactory moistureproofing coating compositions by taking advantage of the plasticizing action of the hydrorosinates themselves. Compositions of this sort are illustrated in Examples XIII and XIV of Table I. Generally speaking, compositions of this type are inferior as regards moistureproofness, flexibility, appearance, et cetera, and consequently compositions employing an additional plasticizer are to be preferred.

In preparing moistureproofing coating compositions comprising hydrorosinates, it has been found that the best results are obtained by limiting the relative amounts of the several constituents. The amount of cellulose derivative, for example, may vary from 40–65% or more of the total solids although in most instances 55–60% is to be preferred. If the hydrorosinate is simply a blending agent, its amount may be of the order of 1–5%, but if it is a substantial part of the film-forming composition, it may constitute 8–30% or more, while if it serves also as plasticizer, it may be present in amounts as high as 40–50% of the total solids content. Usually it is desirable to maintain the ratio of hydrorosinate to cellulose derivative in the neighborhood of 1:4 although 1:1.5 or even 1:8 may sometimes be advantageous.

The wax content of these moistureproofing compositions may vary from less than 1% to 10% or more of the total solids content. Usually about 4% is satisfactory although more or less may be found desirable for different purposes. The ratio of wax to resin may vary from 1:2 to 1:6 although about 1:4 is generally a good combination.

The amount of plasticizer may vary, of course, from none at all, up to about 30 or 40% of the solids content of the composition. The ratio of plasticizer to cellulose derivative depends, obviously, on the nature of the cellulose derivative, the nature and amount of wax, and the plasticizer itself, but it has been found that 1:1.5 to 1:3 may produce very good results while an optimum ratio would seem to be about 1:2.5.

The amount of solvent or solvent mixture may vary according to the composition and to the method of application or purpose desired. The viscosity of the coating composition may be controlled by the amount and nature of the solvent and may be adjusted easily to adapt the solution for coating by brushing, spraying, dipping or any other method familiar to the art.

The specification thus far has been concerned primarily with coating compositions. It is within the scope of this invention, however, to produce self-sustaining films having the solids composition set forth. These films may be prepared in any of the ways known to the art as by casting, choosing suitable solvents and solvent content to facilitate the operation.

Where percentages and proportions of ingredients are referred to throughout the specification and claims, they are intended to be percentages by weight or parts by weight.

Any variation or modification of the invention, as described above, which conforms to the spirit of the invention, is intended to be included within the scope of the claims.

I claim:

1. A moistureproofing composition suitable for use in moistureproofing non-fibrous, transparent, cellulosic sheets or films comprising a hydrorosinate, a wax material and a cellulose derivative.

2. A moistureproofing composition suitable for use in moistureproofing non-fibrous, transparent, cellulosic sheets or films comprising a hydrorosinate, a wax material and a cellulose nitrate.

3. A moistureproofing composition suitable for use in moistureproofing non-fibrous, transparent, cellulosic sheets or films comprising 1 to 50 parts hydrorosinate, wax material in an amount up to 10 parts, 40 to 65 parts cellulose nitrate, and 0 to 40 parts plasticizer, together with a solvent in an amount sufficient to produce a homogeneous solution.

4. A transparent moistureproof film comprising a non-fibrous cellulosic film having a moistureproof coating containing a hydrorosinate, a wax material and a cellulose derivative.

5. A transparent moistureproof film comprising a regenerated cellulose film having a moistureproof coating containing a hydrorosinate, a wax material and cellulose nitrate.

6. A transparent moistureproof film comprising a regenerated cellulose film having a moistureproof coating containing 1 to 50 parts hydrorosinate, wax material in an amount up to 10 parts, 40 to 65 parts cellulose nitrate and 0 to 40 parts plasticizer.

FREDERICK M. MEIGS.